(No Model.)

H. ROGERS.
SLOTTED RIVET.

No. 304,862. Patented Sept. 9, 1884.

Witnesses.
Wm. G. Smith.
L Noble

Inventor
Homer Rogers
by Stephen Moore
Atty

UNITED STATES PATENT OFFICE.

HOMER ROGERS, OF BOSTON, MASSACHUSETTS, ASSIGNOR TO THE SLOTTED RIVET COMPANY, OF NASHUA, NEW HAMPSHIRE.

SLOTTED RIVET.

SPECIFICATION forming part of Letters Patent No. 304,862, dated September 9, 1884.

Application filed January 24, 1884. (No model.)

*To all whom it may concern:*

Be it known that I, HOMER ROGERS, of Boston, in the county of Suffolk and State of Massachusetts, have invented a new and useful Improvement in Rivets, of which the following is a specification.

My invention relates to the class of rivets known as "slotted," which are made with a solid head and shank of one and the same piece of metal, with a portion of the shank cut away so as to leave it bifurcated.

The object of my invention is to provide a rivet of the kind mentioned so shaped that the points thereof shall clinch readily without bending the portion of the bifurcated shank near the head of the rivet; and my invention consists of a solid-headed rivet having a bifurcated shank tapered substantially from the head to the end, as hereinafter set forth.

Figure 1:
Figure 2:
Figure 3:
Figure 4:
Figure 5:
Figure 6:

In the drawings, Figure 1 shows a tapered solid rivet; Fig. 2, the same when completed by slotting; Fig. 3, the same partially clinched; Fig. 4, the same completely clinched; Fig. 5, the old form of slotted rivet; Fig. 6, the same as most frequently clinched.

In carrying out my invention, I first make a rivet with a solid tapered shank, as shown in Fig. 1. Then by sawing or punching I remove a longitudinal section of the shank along its center, leaving it bifurcated, as shown in Fig. 2.

Fig. 6 shows the manner in which a straight-shanked rivet is liable to clinch, the prongs bending most near the head instead of near the points, as is desirable. By making the shank tapering, as shown in Fig. 1, and then cutting away the central portion, as shown in Fig. 2, the rivet will clinch as shown in Figs. 3 and 4, thus giving a smoother and stronger hold on the material being fastened by the rivet.

I claim—

The rivet shown in Fig. 2, composed of a solid head and bifurcated shank of one and the same piece of metal, and having the shank tapered, as herein set forth.

HOMER ROGERS.

Witnesses:
H. STORER BARRY,
STEPHEN MOORE.